United States Patent
Ichikawa

(10) Patent No.: US 9,790,384 B2
(45) Date of Patent: Oct. 17, 2017

(54) INK COMPOSITION FOR WRITING INSTRUMENT AND COLORING MATERIAL

(71) Applicant: MITSUBISHI PENCIL COMPANY, LIMITED, Shinagawa-ku, Tokyo (JP)

(72) Inventor: Shuji Ichikawa, Yokohama (JP)

(73) Assignee: MITSUBISHI PENCIL COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/785,664

(22) PCT Filed: Apr. 23, 2014

(86) PCT No.: PCT/JP2014/061386
§ 371 (c)(1),
(2) Date: Oct. 20, 2015

(87) PCT Pub. No.: WO2014/181683
PCT Pub. Date: Nov. 13, 2014

(65) Prior Publication Data
US 2016/0068694 A1    Mar. 10, 2016

(30) Foreign Application Priority Data

May 7, 2013    (JP) .................................. 2013-097403
Jun. 10, 2013    (JP) .................................. 2013-122167

(51) Int. Cl.
C09D 11/18    (2006.01)
C09D 11/17    (2014.01)
C09D 11/50    (2014.01)
C08K 5/19     (2006.01)
C09D 181/10   (2006.01)

(52) U.S. Cl.
CPC ................ *C09D 11/18* (2013.01); *C08K 5/19* (2013.01); *C09D 11/17* (2013.01); *C09D 11/50* (2013.01); *C09D 181/10* (2013.01)

(58) Field of Classification Search
None
See application file for complete search history.

(56) References Cited

U.S. PATENT DOCUMENTS 5,948,152 A    9/1999  Zhao et al.
2003/0055127 A1    3/2003  Chen et al.

FOREIGN PATENT DOCUMENTS

| CN | 1302315 A | 7/2001 |
| EP | 2540784 A1 | 1/2013 |
| JP | 8-134393 A | 5/1996 |
| JP | 2896691 B2 | 5/1999 |
| JP | 2003-231855 A | 8/2003 |
| JP | 2004-530037 A | 9/2004 |
| JP | 2004-300165 A | 10/2004 |
| JP | 2005-132884 A | 5/2005 |
| JP | 2007-112922 A | 5/2007 |
| JP | 2009-292935 A | 12/2009 |
| JP | 2010-202705 A | 9/2010 |
| JP | 2010-235853 A | 10/2010 |
| JP | 2011-111578 A | 6/2011 |
| JP | 2012-162692 A | 8/2012 |
| JP | 2012-246431 A | 12/2012 |
| JP | 2013-028788 A | 2/2013 |
| WO | 2012/106684 A1 | 11/2012 |

OTHER PUBLICATIONS

Machine translation of JP 2005-132884 A.*
Machine translation of JP 2012-162692 A.*
Machine translation of JP 2004-300165 A.*
International Search Report (PCT/ISA/210) mailed on Jul. 29, 2014, by the Japanese Patent Office as the International Searching Authority for International Application No. PCT/JP2014/061386.
PCT International Preliminary Report on Patentability (IPRP) and Written Opinion mailed on Nov. 19, 2015, in corresponding International Application No. PCT/JP2014/061386 (14 pages).
Extended European Search Report issued Nov. 16, 2016, in corresponding European Patent Application No. 14794728.7. (4 pages).

* cited by examiner

*Primary Examiner* — Vu A Nguyen
(74) *Attorney, Agent, or Firm* — Buchanan, Ingersoll & Rooney PC

(57) ABSTRACT

Provided are an ink composition for writing instruments which has a good solubility of a coloring material in an ink solvent and which is less liable to cause bleeding and feathering on the written lines and is improved in a water resistance, and a coloring material used for preparing the above ink composition. The coloring material includes a material obtained by adding at least one selected from a leuco dye, a halochromic dye and a photochromic compound to a compound represented by the following Formula (I):

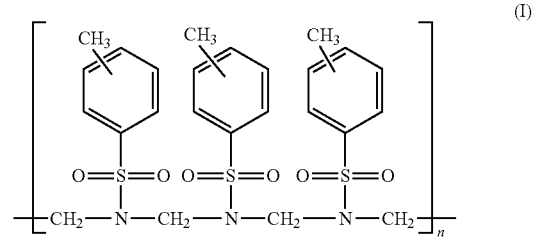

The ink composition for writing instruments is characterized by containing the coloring material described above.

11 Claims, No Drawings

INK COMPOSITION FOR WRITING INSTRUMENT AND COLORING MATERIAL

TECHNICAL FIELD

The present invention relates to and an ink composition for writing instruments and a coloring material, more specifically to an ink composition for writing instruments which has a good solubility of a coloring material in an ink solvent and which is less liable to cause bleeding and feathering on the written lines and is improved in a water resistance, and a coloring material used for preparing the same.

BACKGROUND ART

Various kinds of coloring materials have so far been used for ink compositions for writing instruments.

Known are, for example, 1) black ink compositions for oil base ballpoint pens characterized by using a halochromic dye comprising principally a basic dye as a coloring agent (refer to, for example, a patent document 1), 2) oil base ink compositions for ballpoint pens prepared by using a reversible thermochromic composition comprising an electron-donating coloring organic compound which is a leuco dye, an electron-accepting compound, and a reaction medium for controlling the above color reactions (refer to, for example, a patent document 2), and 3) non-erasable ink compositions for writing instruments prepared by using a photochromic compound as a pigment (refer to, for example, a patent document 3).

However, when the above halochromic dye, leuco dye and photochromic compound are used as a coloring material for ink compositions for writing instruments, involved therein are the problems that they are still short of a solubility in the solvents of the inks and cause feathering and bleeding (transition of drawn lines) on the drawn lines and that the water resistance is not sufficiently high in a certain case.

PRIOR ART DOCUMENTS

Patent Documents

Patent document 1: JP-A H08-134393 (claims, examples and the like)
Patent document 2: JP-A 2009-292935 (claims, examples and the like)
Patent document 3: JP-A 2004-530037 (claims, examples and the like)

DISCLOSURE OF THE INVENTION

In light of the problems on the conventional techniques described above, the present invention intends to solve them, and an object thereof is to provide an ink composition for writing instruments which has a good solubility of a coloring material in an ink solvent and which is less liable to cause bleeding and feathering on the written lines and is improved in a water resistance, and a coloring material.

Intensive researches repeated by the present inventors in order to solve the conventional problems described above have resulted in finding that an ink composition for writing instruments and a coloring material which meet the object described above are obtained by using a coloring material obtained by adding at least one selected from a leuco dye, a halochromic dye and a photochromic compound to a specific compound, and thus, the present inventors have come to complete the present invention.

That is, the present invention resides in the following items (1) to (11).

(1) An ink composition for writing instruments containing a coloring material obtained by adding at least one selected from a leuco dye, a halochromic dye and a photochromic compound to a compound represented by the following Formula (I):

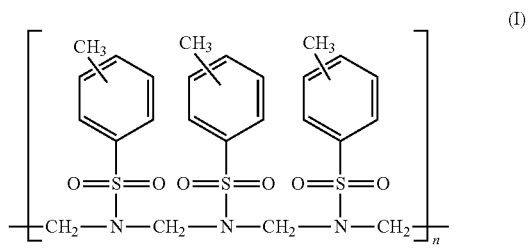

(2) The ink composition for writing instruments as described in the above item (1), wherein the halochromic dye is constituted by a cation of a dimethyldistearylammonium salt represented by the following Formula (II), and an acidic dye:

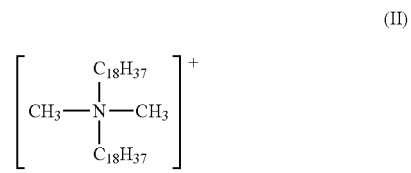

(3) The ink composition for writing instruments as described in the above item (1), wherein a mass ratio of the compound represented by Formula (I) and the leuco dye which are contained in the coloring material falls in a range of 1:0.01 to 1.

(4) The ink composition for writing instruments as described in the above item (1) or (2), wherein a mass ratio of the compound represented by Formula (I) and the halochromic dye which are contained in the coloring material falls in a range of 1:0.1 to 2.

(5) The ink composition for writing instruments as described in the above item (1), wherein a mass ratio of the compound represented by Formula (I) and the photochromic compound which are contained in the coloring material falls in a range of 1:0.001 to 0.1.

(6) A writing instrument charged with the ink composition as described in any one of the above items (1) to (5).

(7) A coloring material obtained by adding at least one selected from a leuco dye, a halochromic dye and a photochromic compound to a compound represented by the following Formula (I):

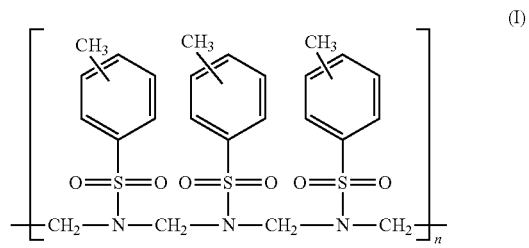

(8) The coloring material as described in the above item (7), wherein the halochromic dye is constituted by a cation of a dimethyldistearylammonium salt represented by the following Formula (II), and an acidic dye:

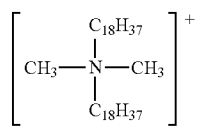

(II)

(9) The coloring material as described in the above item (7), wherein a mass ratio of the compound represented by Formula (I) and the leuco dye which are contained in the coloring material falls in a range of 1:0.01 to 1.
(10) The coloring material as described in the above item (7) or (8), wherein a mass ratio of the compound represented by Formula (I) and the halochromic dye which are contained in the coloring material falls in a range of 1:0.1 to 2.
(11) The coloring material as described in the above item (7), wherein a mass ratio of the compound represented by Formula (I) and the photochromic compound which are contained in the coloring material falls in a range of 1:0.001 to 0.1.

According to the present invention, provided are an ink composition for writing instruments which has a good solubility of a coloring material in an ink solvent and which is less liable to cause bleeding and feathering on the written lines and is improved in a water resistance, and a coloring material. Also, in the coloring material obtained, the dye is integrated with the resin, and therefore when an ink for writing instruments which is based on the condition that a large amount of solid matters is contained therein is prepared, a freedom of blending can be secured.

DESCRIPTION OF THE PREFERRED EMBODIMENTS

The embodiment of the present invention shall be explained below in detail.

The ink composition for writing instruments according to the present invention is characterized by containing a coloring material obtained by adding at least one selected from a leuco dye, a halochromic dye and a photochromic compound to a compound represented by the following Formula (I):

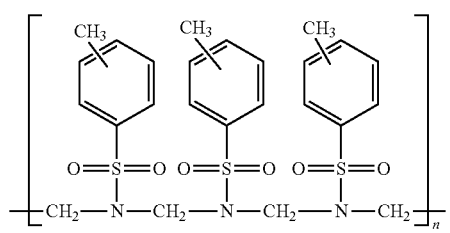

(I)

Leuco Dye:

The leuco dye used in the present invention shall not specifically be restricted as long as it is an electron-donating dye and functions as a coloring agent. To be specific, compounds which have so far publicly been known, such as tripheylmethane base, spiropyran base, fluoran base, dipheylmethane base, rhodamine lactam base, indolyl phthalide base, leuco auramine base compounds, and the like can be used singly (alone) or in a mixture of two or more kinds thereof (hereinafter referred to merely as "at least one") in terms of obtaining an ink having excellent color developing characteristics.

To be specific, the leuco dye includes 6-(dimethylamino)-3,3-bis[4-(dimethylamino)phenyl]-1(3H)-isobenzofuranone, 3,3-bis(p-dimethylaminophenyl)-6-dimethylaminophhtalide, 3-(4-diethylaminophenyl)-3-(1-ethyl-2-methylindole-3-yl) phthalide, 3-(4-diethylamino-2-ethoxyphenyl)-3-(1-ethyl-2-methylindole-3-yl)-4-azaphthalide, 1,3-dimethyl-6-diethylaminofluoran, 2-chloro-3-methyl-6-dimethylaminofluoran, 3-dibutylamino-6-methyl-7-anilinofluoran, 3-diethylamino-6-methyl-7-anilinofluoran, 3-diethylamino-6-methyl-7-xylidinofluoran, 2-(2-chloroanilino)-6-dibutylaminofluoran, 3,6-dimethoxyfluoran, 3,6-di-n-butoxyfluoran, 1,2-benzo-6-diethylaminofluoran, 1,2-benzo-6-dibutylaminofluoran, 1,2-benzo-6-ethylisoamylaminofluoran, 2-methyl-6-(N-p-tolyl-N-ethylamino)fluoran, 2-(N-phenyl-N-methylamino)-6-(N-p-tolyl-N-ethylamino)fluoran, 2-(3'-trifluoromethylanilino)-6-diethylaminofluoran, 3-chloro-6-cyclohexylaminofluoran, 2-methyl-6-cyclohexylaminofluoran, 3-di(n-butyl)amino-6-methoxy-7-anilinofluoran, 3,6-bis(diphenylamino)fluoran, 3-methoxy-4-dodecoxystyrynoquinoline, and the like, and at least one of them can be used.

Further, pyridine base compounds, quinazoline base compounds, bisquinazoline base compounds, and the like which develop yellow to red colors can be used as well.

The above leuco dyes have a lactone skeleton, a pyridine skeleton, a quinazoline skeleton, a bisquinazoline skeleton, and the like, and the colors are developed by opening the above skeletons (rings).

Halochromic Dye:

The halochromic dye used in the present invention includes, for example, at least one of halochromic dyes of basic dyes and acidic dyes, halochromic dyes of basic dyes and acidic compounds, halochromic dyes of acidic dyes and basic compounds, and halochromic dyes constituted by a cation of a dimethyldistearylammonium salt represented by the following Formula (II), and an acidic dye:

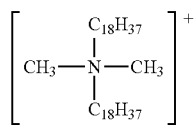

(II)

To be specific, capable of being used are 1) halochromic dyes formed by basic dyes having basic groups such as an amino group in a molecular structure and acidic dyes having acidic groups such as a sulfonic acid group and a carboxylic acid group in a molecular structure, 2) halochromic dyes obtained by combining conjugate bases of acidic compounds with the basic groups of the above basic dyes having basic groups in a molecular structure to make it possible to form salts, 3) halochromic dyes obtained by combining conjugate acids of basic compounds with acidic groups of acidic dyes having acidic groups such as a sulfonic acid group and a carboxylic acid group in a molecular structure to make it possible to form salts, and 4) halochromic dyes constituted by the cation of the dimethyldistearylammonium salt represented by the above Formula (II), and an acidic dye.

The halochromic dye which can be used in 1) to 3) described above includes at least one of respective dyes commercially available under a trade name "VALIFAST COLORS", for example, VALIFAST BLUE 1631, VALIFAST BLUE 1603, VALIFAST BLUE 1621, VALIFAST RED 1308, VALIFAST RED 1320, VALIFAST RED 1355, VALIFAST RED 1362, VALIFAST VIOLET 1701, VALIFAST VIOLET 1704, VALIFAST VIOLET 1731, VALIFAST YELLOW 1101, VALIFAST YELLOW 1109, and VALIFAST YELLOW 1151 (all described above manufactured by Orient Chemical Industries Co., Ltd.), and respective dyes commercially available under a trade name "Aizen Spilon", for example, Aizen Spilon Violet C-RH, Aizen Spilon Red C-RH, Aizen Spilon Yellow C-GHN, SBN Yellow 543, SBN Yellow 530, Aizen Spilon Red C-GH, Aizen Spilon Red C-BH, and Aizen Spilon Yellow CGNH (all described above manufactured by Hodogaya Chemical Co., Ltd.).

The acidic dye which can be used in the halochromic dye of 4) described above includes, for example, C.I. Acid Black 1, ditto 2, ditto 24, ditto 26, ditto 31, ditto 52, ditto 107, ditto 109, ditto 110, ditto 119, and ditto 154, C.I. Acid Yellow 7, ditto 17, ditto 19, ditto 23, ditto 25, ditto 29, ditto 38, ditto 42, ditto 49, ditto 61, ditto 72, ditto 78, ditto 110, ditto 127, ditto 135, ditto 141, and ditto 142, C.I. Acid Red 8, ditto 9, ditto 14, ditto 18, ditto 26, ditto 27, ditto 35, ditto 37, ditto 51, ditto 52, ditto 57, ditto 82, ditto 87, ditto 92, ditto 94, ditto 115, ditto 129, ditto 131, ditto 186, ditto 249, ditto 254, ditto 265, and ditto 276, C.I. Acid Violet 17 and ditto 18, C.I. Acid Blue 1, ditto 7, ditto 9, ditto 22, ditto 23, ditto 25, ditto 40, ditto 41, ditto 43, ditto 62, ditto 78, ditto 83, ditto 90, ditto 93, ditto 103, ditto 112, ditto 113, and ditto 158, C.I. Acid Green 3, ditto 9, ditto 16, ditto 25 and ditto 27, and the like.

The halochromic dyes used in 4) described above can be obtained in the following manner.

For example, a dimethyldistearylammonium salt is added to water (refined water, distilled water, purified water and the like; hereinafter the same shall apply), and they are stirred and dissolved on a condition of room temperature to prepare a solution 1. On the other hand, the acidic dye described above is added to water, and a NaOH aqueous solution is dropwise added, if necessary, thereto to control a pH of the solution to an alkaline side, followed by stirring and dissolving them on a condition of room temperature to prepare a solution 2. The solution 1 is added to the solution 2 prepared above while stirring, and then an acid aqueous solution such as a hydrochloric acid aqueous solution is dropwise added thereto to control a pH of the solution to an acidic side. Then, the solution is filtrated, and the matter thus obtained is further washed with water and/or a solvent and dried, whereby a halochromic dye can be obtained.

The addition amounts of the dimethyldistearylammonium salt and the acidic dye each described above are determined according to equivalents based on ionic valences thereof. That is, when the acidic dye is an anion of 1 valence, 1 equivalent of the cation of the dimethyldistearylammonium salt is added, and when the acidic dye is an anion of 2 valences, 2 equivalents of the cation of the dimethyldistearylammonium salt is added. Provided that, taking the reactivity into consideration, the other compound is added in a larger amount than the theoretical value described above in a certain case.

Among the halochromic dyes of 1) to 4) described above, the halochromic dyes of 4) are particularly preferably used.

Photochromic Compound:

The photochromic compound used in the present invention is a compound having a photochromism in which a color is developed by light and discolored by light or heat, and general purpose compounds have so far been able to be used. It includes, for example, at least one of 2,3-bis(2,4,5-trimethyl-3-thienyl)maleic anhydride, 2,3-bis(2,4,5-trimethyl-3-thienyl)maleimide, cis-1,2-dicyano-1,2-bis(2,4,5-trimethyl-3-thienyl)ethene, 1,2-bis[2-methylbenzo[b]thiophene-3-yl]-3,3,4,4,5,5-hexafluoro-1-cyclopentene, 1,2-bis(2,4-dimethyl-5-phenyl-3-thienyl)-3,3,4,4,5,5-hexafluoro-1-cyclopentene, 1-(2-hydroxyethyl)-3,3-dimethylindolino-6'-nitrobenzopyrilospiran, 1,3,3-trimethylindolinobenzopyrilospiran, 1,3,3-trimethylindolino-6'-nitrobenzopyrilospiran, 1,3,3-trimethylindolino-6'-bromobenzopyrilospiran, 1,3,3-trimethylindolino-8'-methoxybenzopyrilospiran, 1,3,3-trimethylindolino-β-naphthopyrilospiran, 1,3,3-trimethylindolinonaphthospirooxazine, 2,3-dihydro-2-spiro-4'-[8'-aminonaphtalene-1'-(4'H)-one]perimidine (including an o-form), 2,3-dihydro-2-spiro-7'-[8'-imino-7',8'-dihydronaphtalene-1'-amine]perimidine, azobenzene, 3,3'-diphenyl-3H-naphtho[2,1-b]pyran, 2,5-norbornadiene, thioindigo, and the like.

Coloring Material:

The coloring material of the present invention is obtained by adding at least one selected from the leuco dye, the halochromic dye and the photochromic compound each described above to the compound represented by the following Formula (I):

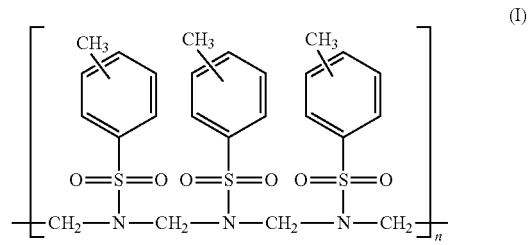

The compound represented by Formula (I) described above is a sulfonic acid resin obtained by adding formaldehyde to p-toluenesulfonamide and heating them to subject them to condensation reaction. The para-position (p-position) compound is a principal component (the p-position compound is more present exceeding 50% by mass), and the ortho-position (o-position) compound may be mixed in the compound. Further, it may be a compound obtained by adding a suitable amount of a cross-linking agent such as benzoguanamine to the above compound, and addition of the above cross-linking agent makes it possible to exert an effect of inhibiting degradation with the passage of time. The number n in Formula (I) is a positive number and is controlled in a range of the preferred weight average molecular weight of the coloring material described later.

The weight average molecular weight of the coloring material of the present invention falls in a range of preferably 300 to 3000. If the weight average molecular weight of the coloring material is less than 300, the fastness such as the water resistance tends to be reduced, and on the other hand, if it exceeds 3000, the viscosity is increased, so that it is not preferred. The weight average molecular weight falls in a range of further preferably 500 to 2000, more preferably 500 to 1000. In the present invention (including examples described later), the weight average molecular weight is measured by GPC (gas permeation chromatography), and the value thereof is a polystyrene-reduced value.

In the specific production of the coloring material, it can be obtained by, for example, 1) in a condensation step of the sulfonic acid resin represented by Formula (I) described above, which is obtained by mixing formaldehyde with p-toluenesulfonamide and heating them to subject them to condensation reaction, adding at least one selected from the leuco dye, the halochromic dye and the photochromic compound each described above to finish the dehydration condensation and then cooling and solidifying the reaction product, and it can be obtained by 2) adding at least one selected from the leuco dye, the halochromic dye and the photochromic compound to the compound produced above (sulfonic acid resin) represented by Formula (I), mixing them or mixing them, if necessary, while heating and then cooling and solidifying the mixture.

In the coloring material of the present invention, when the leuco dye is used, a mass ratio of the compound represented by Formula (I) and the leuco dye which are contained in the coloring material falls in a range of preferably 1:0.01 to 1, further preferably 1:0.01 to 0.5.

Also, when the halochromic dye is used, a mass ratio of the compound represented by Formula (I) and the halochromic dye which are contained in the coloring material falls in a range of preferably 1:0.1 to 2, further preferably 1:0.2 to 1.2.

Further, when the photochromic compound is used, a mass ratio of the compound represented by Formula (I) and the photochromic compound which are contained in the coloring material falls in a range of preferably 1:0.001 to 0.1, further preferably 1:0.01 to 0.1.

If the respective mass ratios of the leuco dye, the halochromic dye and the photochromic compound to the compound represented by Formula (I) are less than the respective lower limit values (0.01, 0.1, 0.001), the sufficiently high color densities are not obtained. On the other hand, if the respective mass ratios exceed the respective upper limit values (1, 2, 0.1), the solubilities in the solvent are reduced to make it liable to bring about the depositions, and therefore it is not preferred.

The coloring material of the present invention is obtained by adding at least one selected from the leuco dye, the halochromic dye and the photochromic compound each described above to the compound (sulfonic acid resin) represented by Formula (I). The leuco dye, the halochromic dye and the photochromic compound are combined with the sulfonamide and integrated with the resin, and the dyes are not eluted. Functions with which the leuco dye, the halochromic dye and the photochromic compound are intrinsically endowed are not damaged, and the good solubility in an organic solvent which is the ink solvent is shown. It makes the ink less susceptible to influences of the external environment, and when the coloring material is used for an ink for writing instruments, the coloring material prevents bleeding and feathering to be caused on the written lines. Also, in the resulting coloring material, the dye is integrated with the resin, and therefore when an ink for writing instruments which is based on the condition that a large amount of solid matters is contained therein is prepared, a freedom of blending can be secured. Further, a freedom of setting when the amounts thereof are set can be expanded, and a decrease in the load in the production and an increase in a diversification of the respective colors developed by the leuco dye, the halochromic dye and the photochromic compound can be achieved.

<Ink Composition for Writing Instruments>

The ink composition for writing instruments according to the present invention is characterized by containing the coloring material obtained by adding at least one selected from the leuco dye, the halochromic dye and the photochromic compound each having the constitutions described above to the compound represented by Formula (I), and it can be used preferably as an ink composition for writing instruments such as oil base ballpoint pens, marking pens and the like.

A content of the coloring material is varied according to the applications (ballpoint pens, marking pens, felt tip pens and the like) of the writing instruments, and it is preferably 0.1 to 30% by mass (hereinafter referred to merely as %), further preferably 0.5 to 25% based on a whole amount of the ink composition.

If a content of the coloring material is less than 0.1%, the tinting power and the color developing power become unsatisfactory, and on the other hand, if it exceeds 30%, blurring is liable to be brought about. Accordingly, both are not preferred.

In the ink composition for writing instruments according to the present invention, various organic solvents which have so far been used in addition to the coloring material described above can be used. Solvents selected from alcohol base solvents, polyhydric alcohol base solvents and glycol ether base solvents can be listed as the preferred solvent.

The alcohol base solvents are aliphatic alcohols having two or more carbon atoms, and they include, to be specific, ethanol, n-propanol, isopropanol, n-butanol, isobutanol, tert-butyl alcohol, 1-pentanol, isoamyl alcohol, sec-amyl alcohol, 3-pentanol, tert-amyl alcohol, n-hexanol, methylamyl alcohol, 2-ethylbutanol, n-heptanol, 2-heptanol, 3-heptanol, n-octanol, 2-octanol, 2-ethylhexanol, 3,5,5-trimethylhexanol, nonanol, n-decanol, undecanol, n-decanol, trimethylnonyl alcohol, tetradecanol, heptadecanol, cyclohexanol, 2-methylcyclohexanol, benzyl alcohol, 2-phenoxyethanol, and many other higher alcohols.

The polyhydric alcohol base solvents include polyhydric alcohols having two or more carbon atoms and two or more hydroxyl groups in a molecule, such as ethylene glycol, diethylene glycol, 3-methyl-1,3-butanediol, triethylene glycol, dipropylene glycol, 1,3-propanediol, 1,3-butanediol, 1,5-pentanediol, hexylene glycol, octylene glycol, and the like.

Among the solvents listed above, the particularly preferred solvent is glycol ethers having 2 to 7 carbon atoms. Also, organic solvents other than ethylene glycol derivatives and the like are preferably used in terms of the safety, the oral toxicity and the like. The examples thereof include polyhydric alcohol derivatives and include as well sorbitan fatty acid base, polyglycerin higher fatty acid base, sucrose fatty acid base, propylene glycol fatty acid base derivatives, and the like.

The glycol ether base solvents include methyl isopropyl ether, ethyl ether, ethyl propyl ether, ethyl butyl ether, isopropyl ether, butyl ether, hexyl ether, 2-ethylhexyl ether, ethylene glycol monohexyl ether, ethylene glycol monophenyl ether, ethylene glycol mono-2-ethylbutyl ether, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, triethylene glycol monobutyl ether, tetraethylene glycol monobutyl ether, 3-methyl-3-methoxy-1-butanol, 3-methoxy-1-butanol, propylene glycol monomethyl ether, propylene glycol monoethyl ether, propylene glycol monopropyl ether, propylene glycol monobutyl ether, propylene glycol phenyl ether, propylene glycol tertiary-butyl ether, dipropylene glycol monomethyl ether, dipropylene glycol monoethyl ether, dipropylene glycol monopropyl ether, dipropylene glycol monobutyl ether, tripropylene glycol monomethyl ether, tripropylene glycol monobutyl ether, tetrapropylene glycol monobutyl ether, and the like.

In addition to the solvents described above, ester base solvents can be used as well. The ester base solvents include, for example, various esters such as propylene glycol methyl ether acetate, propylene glycol diacetate, 3-methyl-3-methoxybutyl acetate, propylene glycol ethyl ether acetate, ethylene glycol ethyl ether acetate, butyl formate, isobutyl formate, isoamyl formate, propyl acetate, butyl acetate, isopropyl acetate, isobutyl acetate, isoamyl acetate, methyl propionate, ethyl propionate, propyl propionate, isobutyl propionate, isoamyl propionate, methyl butyrate, ethyl butyrate, propyl butyrate, methyl isobutyrate, ethyl isobutyrate, propyl isobutyrate, methyl valerate, ethyl valerate, propyl valerate, methyl isovalerate, ethyl isovalerate, propyl isovalerate, methyl trimethylacetate, ethyl trimethylacetate, propyl trimethylacetate, methyl caproate, ethyl caproate, propyl caproate, methyl caprylate, ethyl caprylate, propyl caprylate, methyl laurate, ethyl laurate, methyl oleate, ethyl oleate, triglyceride caprylate, acetyl tributyl citrate, octyl oxystearate, propylene glycol monoricinoleate, methyl 2-hydroxyisobutyrate, 3-methoxybutyl acetate, and the like.

Also, diethers and diesters having no hydroxyl groups in molecules include, to be specific, ethylene glycol diethyl ether, ethylene glycol dibutyl ether, diethylene glycol diethyl ether, diethylene glycol dibutyl ether, diethylene glycol dimethyl ether, dipropylene glycol dimethyl ether, and the like.

A content of the above solvents is varied according to the applications of the writing instruments, the kind of the dyes contained, and the like, and it is preferably 20 to 97%, further preferably 30 to 95% based on a whole amount of the ink composition.

In the ink composition for writing instruments according to the present invention, various resins may be used. These resins are added for the purposes of enhancing a fixability of the ink and preventing offset of the drawn lines and in addition thereto, improving the functions of the coloring material as a dispersant, controlling the viscosity and expediting dissolution of the coloring material. Any resins which have so far been used for inks for oil base ballpoint pens can be used as the resins.

The resins which can be used for the ink composition for writing instruments according to the present invention include, for example, resins represented by ketone resins, styrene resins, styrene-acryl resins, terpene phenol resins, rosin-modified maleic acid resins, rosin phenol resins, alkylphenol resins, phenol base resins, styrene maleic acid resins, rosin base resins, acryl base resins, urea aldehyde base resins, maleic acid base resins, cyclohexanone base resins, polyvinylbutyral, polyvinylpyrrolidone, and the like, which can also be used as a dispersant for the coloring material.

A content of the above resins is preferably 0.5 to 35%, further preferably 1.0 to 20% in terms of the viscosity control and the writing feeling.

In addition to the components described above, various additives which are compatible with the ink without exerting adverse effects on the ink, for example, rust preventives, anti-mold agents, surfactants, lubricants, wetting agents, and the like can be further added in a suitable amount, if necessary, in the present invention. Also, when the leuco dye is used for the coloring material, a suitable amount of a developer which is a component having an ability to develop the leuco dye can be used.

The ink composition for writing instruments according to the present invention can be produced by employing a method which has so far been known. For example, it is obtained by blending the prescribed amounts of the respective components such as the organic solvent, the resin and the like each described above in addition to the coloring material and stirring and mixing them by means of a stirring equipment such as a homomixer, a disper and the like. Further, coarse particles contained in the ink composition may be removed, if necessary, by filtration and centrifugal separation.

The ink composition for writing instruments thus constituted is charged for use in a marking pen equipped with a fiber tip, a felt tip or a plastic tip at a writing tip part and a ballpoint pen equipped with a ballpoint pen tip at a writing tip part.

In the ink composition for writing instruments and the writing instruments, an oil base ink containing the coloring material obtained by adding at least one selected from the leuco dye, the halochromic dye and the photochromic compound to the compound represented by Formula (I) is prepared and charged in a writing instrument such as a ballpoint pen, a marking pen and the like, and the writing instrument charged with the above ink is used to draw lines on a paper surface. Thus, the drawn lines which are excellent in a water resistance and a bleeding resistance are obtained.

EXAMPLES

Next, the present invention shall be explained in further details with reference to examples and comparative examples, but the present invention shall not be restricted to the examples shown below.

Production of Coloring Material

Production Examples 1 to 10

Coloring materials were produced by using the leuco dyes, the halochromic dyes and the photochromic compounds according to the Production Examples 1 to 10 shown below. The leuco dye, the halochromic dye and the photochromic compound were used in powder forms in all examples.

Production Example 1

Production of Coloring Material A-1

Toluenesulfonamide 72 g and a formaldehyde aqueous solution (38%) 24 g were mixed and stirred at 97° C. for 2 hours, and 3-dibutylamino-6-methyl-7-anilinofluoran 4 g which is a leuco dye and develops a black color was added to the above solution. Further, the solution was heated at 150 to 160° C. for 1 hour to subject them to co-condensation. The reaction product was dried under vacuum to thereby remove moisture, and then the product thus obtained was crushed into powders to produce a coloring material A-1. Toluenesulfonamide and formaldehyde were added in a ratio of 3:2 in terms of a mole (hereinafter the same shall apply). Also, a mass ratio of the resin (resin of p-toluenesulfonamide+formaldehyde; hereinafter the same shall apply) and the leuco dye was 1:0.05.

Production Example 2

Production of Coloring Material A-2

A coloring material A-2 was produced in the same manner as in Production Example 1 described above, except that in Production Example 1, chloro-3',6'-bisdiphenylaminofluoran 4 g which is a leuco dye developing a blue color was used in place of 3-dibutylamino-6-methyl-7-anilinofluoran which is the leuco dye. A mass ratio of the resin and the leuco dye was 1:0.05.

Production Example 3

Production of Coloring Material A-3

A coloring material A-3 (hue: blue color) was produced in the same manner as in Production Example 1 described above, except that in Production Example 1, 1,3,3-trimethylindolinobenzopyrilospiran 0.4 g which is a photochromic compound was used in place of 3-dibutylamino-6-methyl-7-anilinofluoran which is the leuco dye. A mass ratio of the resin and the photochromic compound was 1:0.005.

Production Example 4

Production of Coloring Material A-4

A coloring material A-4 (hue: blue color) was produced in the same manner as in Production Example 3 described above, except that in Production Example 3, 1,2-bis(2,4-dimethyl-5-phenyl-3-thienyl)-3,3,4,4,5,5-hexafluoro-1-cyclopentene 0.4 g which is a different photochromic compound was used in place of 1,3,3-trimethylindolinobenzopyrilospiran which is the photochromic compound. A mass ratio of the resin and the photochromic compound was 1:0.05.

Production Example 5

Production of Coloring Material A-5

A coloring material A-5 (hue: yellow color) was produced in the same manner as in Production Example 1 described above, except that in Production Example 1, Spilon Yellow C-GNH (manufactured by Hodogaya Chemical Co., Ltd.) 97 g which is a halochromic dye was used in place of 3-dibutylamino-6-methyl-7-anilinofluoran which is the leuco dye. A mass ratio of the resin and the halochromic dye was 1:1.2.

Production Example 6

Production of Coloring Material A-6

A coloring material A-6 was produced in the same manner as in Production Example 5 described above, except that in Production Example 5, Spilon Violet C-RH (manufactured by Hodogaya Chemical Co., Ltd.) 49 g which is a halochromic dye developing a violet color was used in place of Spilon Yellow C-GNH which is the halochromic dye. A mass ratio of the resin and the halochromic dye was 1:0.6.

Production Example 7

Production of Coloring Material A-7

A coloring material A-7 was produced in the same manner as in Production Example 5 described above, except that in Production Example 5, VALIFAST VIOLET 1701 (manufactured by Orient Chemical Industries Co., Ltd.) 16 g which is a halochromic dye developing a violet color was used in place of Spilon Yellow C-GNH which is the halochromic dye. A mass ratio of the resin and the halochromic dye was 1:0.2.

Production Examples 8 to 10

Production of Coloring Materials A-8 to A-10

Coloring materials were produced by using halochromic dyes constituted by the cation of the dimethyldistearylammonium salt represented by Formula (II) described above and acidic dyes.

Production of Halochromic Dye 1:

All the halochromic dyes used were produced by the following production steps.

Solution 1: the dimethyldistearylammonium salt 20 g of the present invention was added to distilled water 100 g and dissolved by stirring under a room temperature condition.

Solution 2: C.I. Acid Red 52 10 g was added to distilled water 100 g, and a NaOH aqueous solution was dropwise added, if necessary, to control a pH to an alkaline side, followed by dissolving it by stirring under a room temperature condition.

After the solution 1 was added to the solution 2 while stirring, a 18% hydrochloric acid aqueous solution was dropwise added thereto to control a pH to an acidic side, and then the solution was filtrated. Further, the filtrated matter was washed with water and a solvent and then dried to thereby obtain a halochromic dye 1.

Production of Halochromic Dye 2:

A halochromic dye 2 was produced in the same manner as in the production of the halochromic dye 1 described above, except that in the production of the halochromic dye 1, C.I. Acid Violet 17 13 g was used in place of C.I. Acid Red 52 which is the acidic dye.

Production of Halochromic Dye 3:

A halochromic dye 3 was produced in the same manner as in the production of the halochromic dye 1 described above, except that in the production of the halochromic dye 1, C.I. Acid Blue 9 9.1 g was used in place of C.I. Acid Red 52 which is the acidic dye.

Production Example 8

Production of Coloring Material A-8

Toluenesulfonamide 72 g and a formaldehyde aqueous solution (38%) 24 g were mixed and stirred at 97° C. for 2 hours, and the halochromic dye 1 41 g constituted by the cation of the dimethyldistearylammonium salt described above and C.I. Acid Red 52 which is the acidic dye was added to the above solution. Further, the solution was heated at 150 to 160° C. for 1 hour to subject them to co-condensation. The reaction product was dried under vacuum to thereby remove moisture, and then the product thus obtained was crushed into powders to produce a coloring material A-8. Toluenesulfonamide and formaldehyde were added in a ratio of 3:2 in terms of a mole (hereinafter the same shall apply). Also, a mass ratio of the resin (resin of p-toluenesulfonamide+formaldehyde; hereinafter the same shall apply) and the halochromic dye was 1:0.5.

Production Example 9

Production of Coloring Material A-9

A coloring material A-9 was produced in the same manner as in Production Example 8 described above, except that in Production Example 8, the halochromic dye 2 24 g was used in place of the halochromic dye 1. A mass ratio of the resin and the halochromic dye was 1:0.3.

Production Example 10

Production of Coloring Material A-10

A coloring material A-10 was produced in the same manner as in Production Example 8 described above, except that in Production Example 8, the halochromic dye 3 56 g was used in place of the halochromic dye 1. A mass ratio of the resin and the halochromic dye was 1:0.7.

Examples 1 to 9 and Comparative Examples 1 to 9

Prescriptions of Inks

The respective ink compositions for oil base ballpoint pens were prepared in blend prescriptions shown in the following Table 1 and Table 2 by an ordinary method. The blend formulations of the ink compositions for ballpoint pens prepared by using the color materials produced in Production Examples 1 to 7 are shown in Table 1 (Examples 1 to 6 and Comparative Examples 1 to 6), and the blend formulations of the ink compositions for ballpoint pens prepared by using the color materials produced in Production Examples 8 to 10 are shown in Table 2 (Examples 7 to 9 and Comparative Examples 7 to 9).

Preparation of Ballpoint Pens:

The respective ink compositions obtained above were used to prepare ballpoint pens. To be specific, a holder of a ballpoint pen (trade name: SG-100, manufactured by Mitsubishi Pencil Co., Ltd.) was used to charge the respective oil base inks described above into a refill comprising a polypropylene-made ink reservoir having an inner diameter of 1.75 mm and a length of 135 mm, a stainless-made tip (cemented carbide alloy ball; ball diameter: 0.5 mm) and a joint connecting the reservoir and the tip, and an ink follower comprising a mineral oil as a principal component was loaded at a rear end of the ink, whereby oil base ballpoint pens were prepared.

The respective ballpoint pens obtained in Examples 1 to 9 and Comparative Examples 1 to 9 were used to evaluate a water resistance and a bleeding resistance by the following evaluation methods. The results thereof are shown in the following Table 1 and Table 2.

Evaluation Method of Water Resistance:

The writing instruments charged with the respective ink compositions for writing instruments obtained above were used to write lines on writing papers. The papers having thereon the written lines were dipped in distilled water to visually observe the states of the papers after 24 hours, and they were evaluated according to the following evaluation criteria.

Evaluation Criteria:
◯: no change is observed on drawn lines
Δ: feathering is observed a little on drawn lines
X: large change is observed on density and state of drawn lines Evaluation Method of Bleeding Resistance:

A writing paper on which lines were drawn was interposed between a paper and put in a clear file, and it was stored for 2 weeks on the conditions of 50° C. and 60% RH. Then, a back surface of the writing paper was visually observed to evaluate it according to the following evaluation criteria.

Evaluation Criteria:
◯: no change is observed
Δ: drawn lines bleed a little
X: many drawn lines bleed

TABLE 1

(whole amount: 100% by mass)

|  |  | Example | | | | | | Comparative Example | | | | | |
| --- | --- | --- | --- | --- | --- | --- | --- | --- | --- | --- | --- | --- | --- |
|  |  | 1 | 2 | 3 | 4 | 5 | 6 | 1 | 2 | 3 | 4 | 5 | 6 |
| Coloring material | A-1 | 1.5 | | | | | | | | | | | |
|  | A-2 | | 1.5 | | | | | | | | | | |
|  | A-3 | | | 20 | | | | | | | | | |
|  | A-4 | | | | 20 | | | | | | | | |
|  | A-5 | | | | | 17 | 17 | | | | | | |
|  | A-6 | | | | | 33 | 33 | | | | | | |
|  | A-7 | | | | | 5 | 5 | | | | | | |
|  | 3-Dibutylamino-6-methyl-7-anilinofluoran | | | | | | | 0.5 | | | | | |
|  | Chloro-3',6'-bisdiphenylaminofluoran | | | | | | | | 0.5 | | | | |
|  | 1,3,3-Trimethylindolinobenzopyrilospiran | | | | | | | | | 1 | | | |
|  | 1,2-Bis(2,4-dimethyl-5-phenyl-3-thienyl)-3,3,4,4,5,5-hexafluoro-1-cyclopentene | | | | | | | | | | 1 | | |
|  | Spilon Yellow C-GNH *1 | | | | | | | | | | | 10 | 10 |
|  | Spilon Violet C-RH *2 | | | | | | | | | | | 19.5 | 19.5 |
|  | VALIFAST VIOLET 1701 *3 | | | | | | | | | | | 2.8 | 2.8 |
| Developer | RS-410 *4 | 1 | 1 | | | | | 1 | 1 | | | | |
| Resin | S-LEC BL-S *5 | 3 | 3 | 3 | 3 | 3 | 2 | 3 | 3 | 3 | 3 | 3 | 2 |
|  | S-LEC BH-S *6 | 0.5 | 0.5 | 0.5 | 0.5 | 0.5 | | 0.5 | 0.5 | 0.5 | 0.5 | 0.5 | |
|  | Hilac 110H *7 | 8 | 8 | 8 | 8 | | 10 | 8 | 8 | 8 | 8 | 8 | 10 |
| Surfactant | Midol 10 *8 | | | | | 0.2 | | | | | | 0.2 | |
| Solvent | Propylene glycol monomethyl ether | | 97.5 | | 80 | | | 87.0 | 98.5 | | 99 | | |
|  | Benzyl alcohol | | | | | 5 | | | | | | | 10.2 |
|  | 2-Phenoxyethanol | | | | | 28 | | | | | | | 45.5 |
|  | 3-Methoxy-3-methyl-1-butanol | 86.0 | | 68.5 | | 33.3 | | | | 87.5 | | 56.0 | |

TABLE 1-continued

|  | | Example | | | | | | Comparative Example (whole amount: 100% by mass) | | | | | |
| --- | --- | --- | --- | --- | --- | --- | --- | --- | --- | --- | --- | --- | --- |
|  | | 1 | 2 | 3 | 4 | 5 | 6 | 1 | 2 | 3 | 4 | 5 | 6 |
| Weight average molecular weight | | 680 | 750 | 710 | 630 | 650 | 720 | — | — | — | — | — | — |
| Evaluation | Water resistance | ○ | ○ | ○ | ○ | ○ | ○ | Coloring material is not completely dissolved, and residue is present | | | | Δ | X |
|  | Bleeding resistance | ○ | ○ | ○ | ○ | ○ | ○ | | | | | X | X |

*1, 2: halochromic dyes manufactured by Hodogaya Chemical Co., Ltd.;
*3: halochromic dye manufactured by Orient Chemical Industries Co., Ltd.;
*4: phosphate manufactured by Toho Chemical Industry Co., Ltd.;
*5, 6: butyral resins manufactured by Sekisui Chemical Co., Ltd.;
*7: ketone resin manufactured by Hitachi Chemical Co., Ltd.;
*8: decyl glucoside manufactured by Kao Corporation

TABLE 2

|  | | Example | | | Comparative Example (whole amount: 100% by mass) | | |
| --- | --- | --- | --- | --- | --- | --- | --- |
|  | | 7 | 8 | 9 | 7 | 8 | 9 |
| Coloring material | A-8 | 30 | | | | | |
|  | A-9 | | 25 | | | | |
|  | A-10 | | | 30 | | | |
|  | Halochromic dye 1 | | | | 30 | | |
|  | Halochromic dye 2 | | | | | 25 | |
|  | Halochromic dye 3 | | | | | | 30 |
| Resin | S-LEC BL-S *5 | | 4 | 3 | | 4 | 3 |
|  | S-LEC BH-S *6 | 1 | 1 | 1 | 1 | 1 | 1 |
|  | Hilac 110H *7 | 5 | 5 | 5 | 5 | 5 | 5 |
| Surfactant | Midol 10 *8 | 0.5 | | | 0.5 | | |
| Solvent | Benzyl alcohol | | 43 | | | 43 | |
|  | 2-Phenoxyethanol | | 22 | | | 22 | |
|  | 3-Methoxy-3-methyl-1-butanol | 63.5 | | 61 | 63.5 | | 61 |
| Weight average molecular weight | | 650 | 600 | 700 | — | — | — |
| Evaluation | Water resistance | ○ | ○ | ○ | Δ | Δ | Δ |
|  | Bleeding resistance | ○ | ○ | ○ | X | X | X |

*5, 6: butyral resins manufactured by Sekisui Chemical Co., Ltd.
*7: ketone resin manufactured by Hitachi Chemical Co., Ltd.
*8: decyl glucoside manufactured by Kao Corporation As apparent from the results shown in Table 1 and Table 2, it has become clear that the ink compositions for writing instruments produced in Examples 1 to 9 falling in the scope of the present invention are excellent in a water resistance and a bleeding resistance as compared with the ink compositions for writing instruments produced in Comparative Examples 1 to 9 falling outside the scope of the present invention.

In contrast with this, the ink compositions produced in Comparative Examples 1 to 6 shown in Table 1 were the respective ink compositions containing the leuco dyes (Comparative Examples 1 and 2), the photochromic compounds (Comparative Examples 3 and 4) and the halochromic dyes (Comparative Examples 5 and 6) before processing each used in Production Examples 1 to 6, and the ink compositions produced in Comparative Examples 7 to 9 shown in Table 2 were the respective ink compositions containing the leuco dyes 1 to 3 before processing each used in Production Examples 8 to 10. In the above cases, the satisfactory and sufficiently high water resistances and bleeding resistances are not obtained.

INDUSTRIAL APPLICABILITY

The ink compositions for writing instruments prepared by using the coloring materials according to the present invention are suitably used for writing instruments such as ballpoint pens, marking pens and the like.

What is claimed is:

1. An ink composition for writing instruments containing a coloring material obtained by co-condensation reaction between at least one dye selected from a leuco dye, a halochromic dye and a photochromic compound, and a compound represented by the following Formula (I):

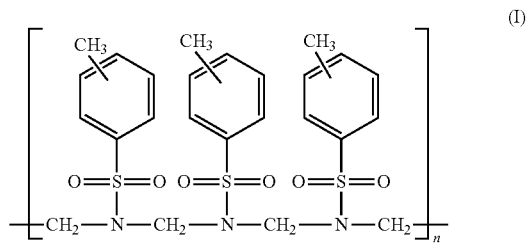

(I)

wherein the dye is added during a polymerization reaction between toluenesulfonamide and formaldehyde, the polymerization reaction forming the compound represented by the Formula (I).

2. The ink composition for writing instruments as described in claim 1, wherein the halochromic dye is constituted by a cation of a dimethyldistearylammonium salt represented by the following Formula (II), and an acidic dye:

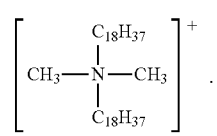

(II)

3. The ink composition for writing instruments as described in claim 1, wherein a mass ratio of the compound represented by Formula (I) and the leuco dye which are contained in the coloring material falls in a range of 1 : 0.01 to 1 : 1.

4. The ink composition for writing instruments as described in claim 1 or 2, wherein a mass ratio of the compound represented by Formula (I) and the halochromic dye which are contained in the coloring material falls in a range of 1: 0.1 to 1 : 2.

5. The ink composition for writing instruments as described in claim 1, wherein a mass ratio of the compound represented by Formula (I) and the photochromic compound which are contained in the coloring material falls in a range of 1: 0.001 to 1: 0.1.

6. A writing instrument charged with the ink composition as described in claim 1.

7. A coloring material obtained by co-condensation reaction between at least one dye selected from a leuco dye, a halochromic dye and a photochromic compound, and a compound represented by the following Formula (I):

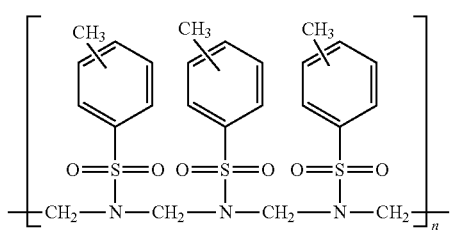

wherein the dye is added during a polymerization reaction between toluenesulfonamide and formaldehyde, the polymerization reaction forming the compound represented by the Formula (I).

8. The coloring material as described in claim 7, wherein the haloehromic dye is constituted by a cation of a dimethyldistearylammonium salt represented by the following Formula (II), and an acidic dye:

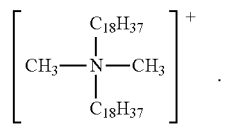

9. The coloring material as described in claim 7, wherein a mass ratio of the compound represented by Formula (I) and the leuco dye which are contained in the coloring material falls in a range of 1 : 0.01 to 1 : 1.

10. The coloring material as described in claim 7 or 8, wherein a mass ratio of the compound represented by Formula (I) and the halochromic dye which are contained in the coloring material falls in a range of 1 : 0.1 to 1 :2.

11. The coloring material as described in claim 7, wherein a mass ratio of the compound represented by Formula (I) and the photochromic compound which are contained in the coloring material falls in a range of 1 : 0.001 to 1 : 0.1.

\* \* \* \* \*